United States Patent Office 3,346,021
Patented Oct. 10, 1967

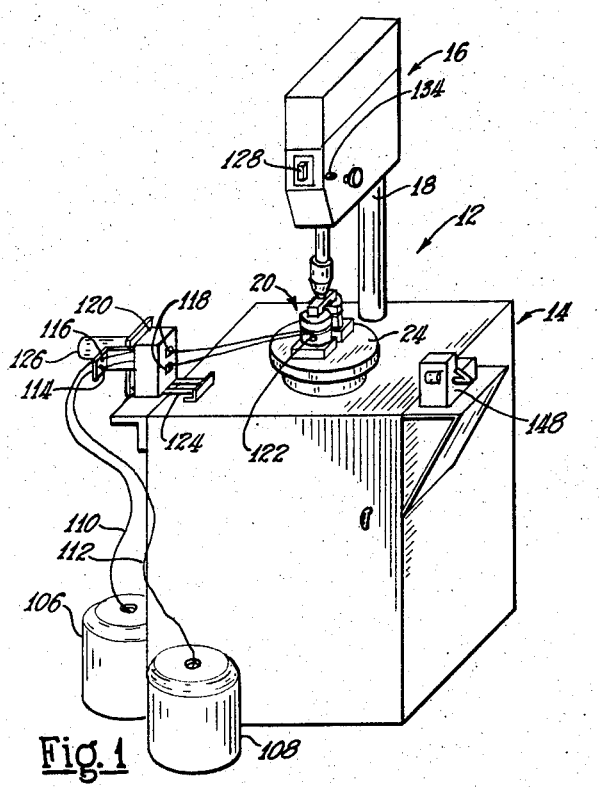

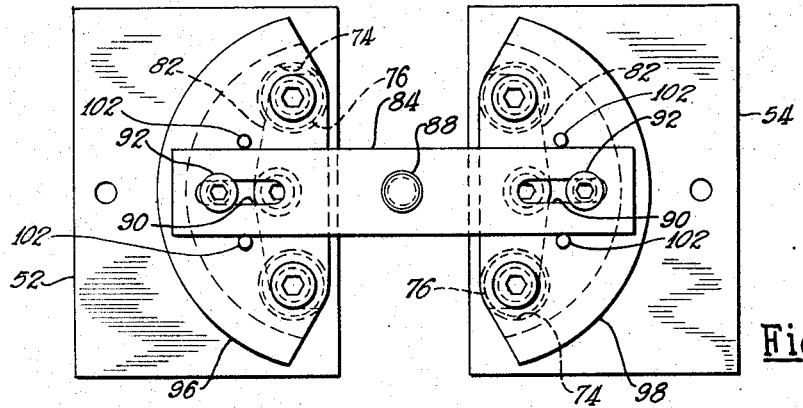
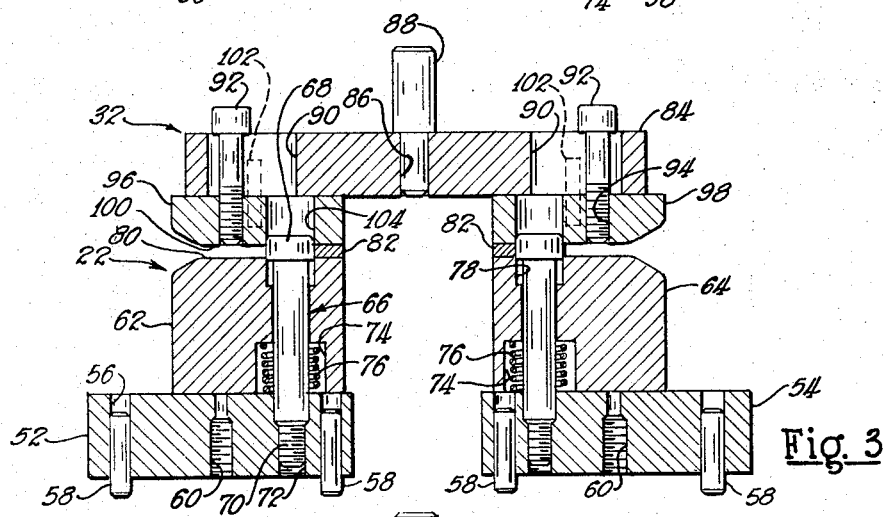
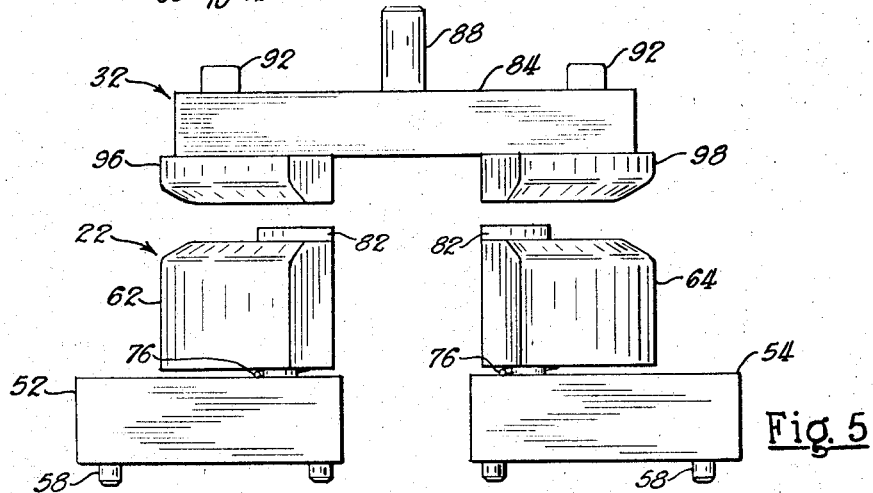
INVENTOR.
ALBERT I. ROSS
BY
Owen & Owen
ATTORNEYS

3,346,021
APPARATUS FOR WINDING ARMATURE COILS
Albert I. Ross, 425 E. Grant Road, Tucson, Ariz. 85705
Filed Mar. 5, 1965, Ser. No. 437,512
8 Claims. (Cl. 140—92.2)

This invention relates to apparatus for winding coils and more particularly for winding coils employed in armatures of electric motors and the like.

Heretofore, coils for electric motors have been either wound directly on the armatures or have been preformed by winding the separate coils by hand and subsequently positioning them on the armature. In either event, the winding process has been time consuming and expensive from a labor standpoint. The present invention relates to a powered winder for winding or preforming coils more rapidly and accurately than heretofore possible. The winder according to the invention is versatile, being capable of winding coils of a large variety of sizes, shapes, number of turns, and wire diameters. The new winder also uses a minimum number of components and is of simplified design so as to be low in cost and reliable. The combination of versatility and low cost, in particular, make the new winder suitable for use in the rebuilding of armatures.

It is, therefore, a principal object of the invention to provide a power driven winder for producing coils for armatures of electric motors and generators, for example.

Another object of the invention is to provide a winder for armature coils which is more versatile and capable of producing coils of a large variety of shapes and sizes.

Still another object of the invention is to provide a powered winder for armature coils which is low in cost and reliable.

Other objects and advantages of the invention will be apparent from the following detailed description of a preferred embodiment thereof, reference being made to the accompanying drawing, in which:

FIG. 1 is a view in perspective of a powered winder embodying the invention;

FIG. 2 is a somewhat schematic view in elevation, with parts broken away and with parts in cross section, of the winder of FIG. 1, and showing controls used in the operation thereof;

FIG. 3 is a greatly enlarged view in vertical cross section of a winding head used with the powered winder;

FIG. 4 is a top view of the winding head shown in FIG. 3;

FIG. 5 is a view in vertical cross section similar to FIG. 3, but with portions of the winding head shown in a different position;

FIG. 6 is a diagram of pneumatic and electrical controls for the winder; and

FIG. 7 is a view in perspective of a coil made with the winder.

Referring to the drawings, and more particularly to FIGS. 1 and 2, a powered winder according to the invention as indicated at 12 and basically includes a base cabinet 14, an upper support housing 16 mounted on a post 18, and a winding head 20.

A lower portion 22 of the winding head 20 is mounted on a drive or face plate 24 which is rotatably mounted on the base cabinet 14 and has a depending shank 26 engaged with a drive shaft 28 of a motor 30. The motor 30 can be combined with a suitable reducer, if desired.

An upper portion 32 of the winding head 20 is held by a chuck 34 connected to a rotatable shaft 36. The shaft 36 extends through a hollow cylindrical member 38 having a gear rack 40 on one side thereof. The gear rack 40 is engaged by a pinion gear 42 which, in turn, is engaged by a drive pinion gear 44 which is rotated by means of a link 46 connected to a piston rod 48 of a pneumatic ram 50 for raising and lowering the chuck 34.

Referring now more particularly to the winding head 20 and FIGS. 3–5, the lower winding head portion 22 includes a pair of spaced adaptor plates 52 and 54. Each of the plates 52 and 54 has two openings 56 to receive dowel pins 58, and has threaded holes 60 to receive mounting screws by means of which the plates 52 and 54 can be affixed to the drive plate 24. The drive plate 24 can be provided with suitable radially extending slots to receive the dowel pins 58 and the mounting screws so that the adaptor plates 52 and 54 can be mounted thereon in any desired radial position to space apart the plates 52 and 54 a predetermined distance.

Two winding blocks 62 and 64 are supported by the adaptor plates 52 and 54 by means of a plurality of winding pegs 66 having enlarged heads 68 at one end and having threaded portions 70 at the opposite end, the latter being received in threaded openings 72 of the plates 52 and 54. As shown, there are six of the pegs 66 for the winding head portion 22, three for each of the blocks 62 and 64. These pegs are arranged in each block in the pattern of an isosceles triangle, as shown in FIG. 4, and lying on an arc of a given radius, but the pegs can be arranged in other configurations, if desired. Further, in some instances, the center pegs in each block may be removed to form a rectangular coil of wire. Recesses 74 are provided in the winding block 62 and 64 at the side opposite the winding peg heads 68 with a back-up spring 76 located in each of the recesses 74 around the shank portions of the windings pegs 66. While the springs 76 are shown around all six pegs, they can equally well be located around only the outer four pegs. The springs 76 are maintained in compression between the blocks and the adaptor plates 52 and 54 so as to urge the blocks away from the adaptor plates.

Normally, the blocks 62 and 64 are pushed outwardly from the plates 52 and 54, as shown in FIG. 5, so that the winding peg heads 68 are received in head recesses 78 of the blocks 62 and 64 so as to be flush or even slightly recessed below circular, flat coil-forming surfaces 80 on the blocks 62 and 64. Two spaced plates 82 are affixed to the blocks 62 and 64 within the area defined by the six pegs and these spacers help to determine the thickness of the coil to be wound on the winder 20.

The upper winder portion 32 includes a hold-down block 84 having a central opening 86 which receives a chucking plug 88. The chucking plug 88 is received in the chuck 34 to rotatably support the upper winding head portion 32 and to move it vertically by means of the hydraulic ram 50. The hold-down block 84 has two longitudinally extending slots 90 near the ends thereof through which extend machine screws 92. The machine screws 92 are received in tapped holes 94 of clamping plates 96 and 98. The plates 96 and 98 also provide circular, flat, coil-forming surfaces 100 facing the surfaces 80 of the winding blocks 62 and 64 and are of the same general size and shape. The outer adjacent peripheral edges of both the winding blocks and the clamping plates are flared to facilitate entry of the wire being wound. Also, the adjacent transverse edges of the blocks and clamping plates, where they otherwise would meet the peripheral edges, are cut back, as shown in FIG. 4, to enable easier access to the coil so an operator can tape the wound coil after the winding is completed.

The clamping plates 96 and 98 can be moved apart with the aid of the longitudinal slots 90 in the hold-down block 84, with the clamping plates guided by four guide pins 102 affixed to the plates and extending along each side of the hold-down block 84.

When the upper winding head portion 32 is moved downwardly toward and against the lower portion 22, the clamping plates 96 and 98 engage the spacers 82 and move the winding blocks 62 and 64 against the adaptor plates 52 and 54 when the force of the springs 76 is overcome. The peg heads 68 then can move into openings 104 in the plates 96 and 98, bridging an annular winding space established between the surfaces 80 and 100 by the spacers. When the winding head 20 is in this position, it is ready to receive wire and wind it into an appropriate coil.

Where a coil is to be formed from two separate wires, one of which may be insulated for example, the wires are fed from two separate sources or receptacles 106 and 108 (FIG. 1). Wires 110 and 112 are threaded through guide eyes 114 and 116 and between tension fingers 118 of a tensioning device 120. The wires are then affixed to a clip or holder 122 affixed to the lower winder portion 22. The tension device 120 is mounted for movement toward and away from the winding head 20, being mounted on tracks or guide rods 124. Movement is effected by means of a tension pneumatic ram 126. The device 120 is normally in a position closer to the winding head 20 but is moved away therefrom by retraction of a piston rod of the ram 126 when power is applied. At this time, the powered winder 12 is ready to operate.

When a first switch 128 (FIGS. 1 and 6) is closed, a circuit is completed to a solenoid 130 which opens an air valve 132 to supply air from a suitable source to the chuck ram 50 and the tension ram 126. This causes the rod 48 to move downwardly and thereby move the member 38 and the chuck 34 downwardly until the upper winding head portion 32 is moved into contact with the winding head portion 22 to move the winding blocks 62 and 64 against the adaptor plates 52 and 54. The winding peg heads 68 are then received in the openings 104 of the clamping plates 96 and 98. At the same time, the ram 126 retracts the tension device 120 to place the wires 110 and 112 under initial tension. The actual winding operation is then ready to begin.

For this purpose, a second switch 134 is closed to complete a circuit to the motor 30 and initiate turning of the winding head 20. At the same time that the motor 30 is energized, a solenoid-operated brake 136 for the drive table and a solenoid-operated brake 138 for the chuck are energized to retract the brakes from the drive table 24 and part of the chuck shaft 36, respectively. A counter switch 140 is set to a predetermined number of revolutions desired for the coil prior to the closing of the switch 128. The counter switch 140 is of the stepping type which is energized or operated by a circuit breaker 142 which is opened and closed once during each revolution of the winder. For this purpose, the circuit breaker 142 can be operated by a cam 144 mounted on a portion of the chuck shaft 36, above the member 38.

When the counter switch 140 is stepped a number of times equal to the number of revolutions set by the operator, the circuit is opened and the motor stopped. At the same time, the brake solenoids 136 and 138 are deenergized to cause brakes to engage the table 54 and the shaft 36 respectively and cause the winding head 20 to stop almost immediately. A coil with the predetermined number of turns now has been wrapped on the winding pegs 66 and specifically the head 68 thereof. The coil, after the winding head is stopped, is then taped, preferably at four points, two on each side, in the space between the winding blocks and the clamping plates. The first switch 128 can then be deenergized to stop the flow of air to cause the chuck to raise the upper winding head portion 32. At the same time, the tension device is moved toward the winding head 20. The wires 110 and 112 can then be cut between the winding head 20 and the tension device 120 or the tension device itself can contain suitable blades for severing the wires.

The coil is then complete and is ready to be assembled with an armature. A coil of this nature is shown in FIG. 7 and includes the two wires 110 and 112 in a parallel arrangement and the coil held in assembled relation by four spaced tapes 146. The tape is supplied by an adjacent dispenser 148 (FIG. 1).

For wires of different diameters and for heavier or thinner coils, the spacers 82 can be replaced with thinner or thicker ones. In addition, as previously discussed, the pegs 66 can be placed in different configurations or the center pegs can be removed to change the shape of the resulting coil. With the specific winder shown, the number of turns in the coil can be varied from one to twenty-one. The versatility and simplicity of the winder 12 enables it to be applied to many operations where hand winding otherwise would be necessitated.

Various modifications of the above described embodiment of the invention will be apparent to those skilled in the art, and it is to be understood that such modifications can be made without departing from the scope of the invention, if they are within the spirit and the tenor of the accompanying claims.

I claim:
1. Apparatus for winding a coil of wire for an armature or the like, said apparatus comprising a pair of adaptor plates, means for fastening said plates to a drive plate of a machine so that said adaptor plates can be moved toward and away from one another, a pair of winding blocks each having a plurality of passages therethrough, with the passages of each block lying on an arc of a given radius, a winding peg extending through each of said block passages and affixed to the respective adaptor plate, said pegs having heads projecting beyond said winding block when the blocks are in one position against said adaptor plates, and said blocks extending at least to said peg heads when said blocks are in a second position spaced from said adaptor plates, resilient means between said adaptor plates and said winding blocks and urging said blocks toward the second position, a chucking plug adapted to be rotatably supported by a chuck or the like in axial alignment with the axis of the drive plate, a hold down block centrally affixed to said chucking plug, said hold down block having slots at end portions thereof, a pair of clamping plates, bolt means extending through said slots and threadedly engaging said clamping plates, said clamping plates each having openings aligned with said passages of said winding blocks to receive said heads of said winding pegs, and spacer plates affixed to one of said clamping plates and said winding blocks within the confines of an imaginary area defined by said winding pegs, said spacer plates being effective to limit movement of said clamping plates and winding blocks toward one another, whereby said winding blocks can move from their second positions to their first positions and overcome the force of said resilient means when said spacer plates are in contact with both said winding blocks and said clamping plates and are moved toward said winding blocks.

2. Apparatus for winding a coil of wire for an armature or the like, said apparatus comprising a pair of adaptor plates, means for fastening said plates to a drive plate so that said adaptor plates can be moved toward and away from one another, a pair of winding blocks each having a plurality of passages therethrough, a winding peg extending through each of said block passages and affixed to the respective adaptor plates, each of said pegs having a head projecting beyond said winding blocks when the blocks are in one position adjacent said adaptor plates, and said blocks extending at least to said peg heads when said blocks are in a second position spaced from said adaptor plates, resilient means between said adaptor plates and said winding blocks and urging said blocks toward the second position, a chucking plug adapted to be rotatably supported by a chuck in axial alignment with the axis of the drive plate, a hold down block centrally affixed to said chucking plug, a pair of clamping plates, means fastening said clamping plates to said hold down block in a manner to provide selective movement of the clamping plates to predetermined positions along said hold down block, said clamping plates each having openings aligned with said winding pegs to receive said heads of said winding pegs, and spacer plates affixed to one of said clamping plates and said winding blocks to limit movement of said clamping plates and winding blocks toward one another whereby said winding blocks can move from their second positions to their first positions and overcome the force of said resilient means when said winding blocks and said clamping plates are moved together.

3. Apparatus for winding a coil of wire for an armature or the like, said apparatus comprising adaptor plate means, means for fastening said plate means to a drive plate, winding block means having a plurality of passages therethrough, a winding peg extending through each of said block passages and affixed to the adaptor plate means, each of said pegs having a head projecting beyond said winding block means when in one position adjacent said adaptor plate means, and said block means extending at least to said peg heads when said block means are in a second position spaced from said adaptor plate means, said pegs also having means to prevent movement of said adaptor plate means beyond the second position, resilient means between said adaptor plate means and said winding block means, a chucking plug to be rotatably supported, a hold down block centrally affixed to said chucking plug, a pair of clamping plates fastened to said hold down block, said clamping plates having openings aligned with said winding pegs to receive said heads of said pegs, and spacer plates positioned between said clamping plates and said winding block means to limit movement of said clamping plates and winding block means toward one another whereby said winding block means can move from their second positions to their first positions and overcome the force of said resilient means when said winding block means and said clamping plates are moved together.

4. Apparatus for winding a coil of wire for an armature or the like, said apparatus comprising a pair of adaptor plates, means for fastening said plates to a drive plate of a machine so that said adaptor plates can be moved toward and away from one another along lineal paths in a manner to provide selective movement of the clamping plates, a pair of winding blocks each having a plurality of passages therethrough, a winding peg extending through each of said block passages and affixed to the respective adaptor plate, a chucking plug adapted to be rotatably supported by a chuck or the like in axial alignment with the axis of the drive plate, a hold down block centrally affixed to said chucking plug, said hold down block having slots at end portions thereof, a pair of clamping plates, bolt means extending through said slots and threadedly engaging said clamping plates in a manner to provide selective movement of said clamping plates to predetermined positions along said hold down block, said clamping plates each having openings alignable with said passages of said winding blocks to receive said heads of said winding pegs, and spacer plates affixed to one of said clamping plates and said winding blocks within the confines of an imaginary area defined by said winding pegs, said spacer plates being effective to limit movement of said clamping plates and winding blocks toward one another.

5. A winder for forming a coil of wire for an armature or the like, said winder comprising a motor having a drive shaft, a drive plate connected to said drive shaft, a pair of adaptor plates, means for fastening said adaptor plates to said drive plates to enable said adaptor plates to be moved toward and away from one another, a pair of winding blocks having a plurality of passages therethrough, a winding peg extending through each of said block passages and affixed to said adaptor plates, said pegs having heads projecting beyond said winding blocks when said blocks are in one position adjacent said adaptor plates, and said peg heads being recessed in said blocks when said blocks are in a second position spaced from said adaptor plates, resilient means between said adaptor plates and said winding blocks and urging said blocks toward the second position, a chuck axially aligned with said drive shaft, means rotatably supporting said chuck for longitudinal movement toward and away from said winding blocks, means for moving said chuck toward and away from said winding blocks, a chucking plug adapted to be received by said chuck, a hold down block centrally affixed to said chucking plug, a pair of clamping plates, means fastening said clamping plates to said hold down block in a manner to provide selective movement of the clamping plates to predetermined positions along said hold down block, said clamping plates each having openings aligned with said winding pegs to receive said heads of said pegs, spacer plates between said clamping plates and said winding blocks to limit movement of said clamping plates and said winding blocks toward one another, a tension device to receive and engage wire to be wound on said winding pegs, means supporting said tension device to one side of said winding blocks, means limiting movement of said tension device toward and away from said winding blocks, means for moving said tension device toward and away from said winding blocks, and brake means for abruptly stopping rotary movement of said drive plate and said chuck when said motor is stopped.

6. A winder for forming a coil of wire for an armature or the like, said winder comprising a motor having a drive shaft, a drive plate connected to said drive shaft, a pair of adaptor plates, means for fastening said adaptor plates to said drive plates, a pair of winding blocks, winding pegs projecting beyond said winding blocks, a chuck axially aligned with said drive shaft, means rotatably supporting said chuck for movement toward and away from said winding blocks, means for moving said chuck toward and away from said winding blocks, chucking plug means adapted to be received by said chuck, a pair of clamping plates, means fastening said clamping plates to said plug means, said clamping plates each having openings to receive said pegs, spacer plates between said clamping plates and said winding blocks to limit movement of said clamping plates and said winding blocks toward one another, a tension device to receive and engage wire to be wound on said winding pegs, means supporting said tension device to one side of said winding blocks, means limiting movement of said tension device toward and away from said winding blocks, means for moving said tension device toward and away from said winding blocks, and brake means for abruptly stopping rotary movement of said drive plate and said chuck when said motor is stopped.

7. A winder for forming a coil of wire for an armature or the like, said winder comprising a motor having a drive shaft, a drive plate connected to said drive shaft, a pair of adaptor plates, means for fastening said adaptor plates to said drive plates, a pair of winding blocks having a plurality of passages therethrough, a winding peg extending through each of said block passages and affixed to said adaptor plates, said pegs having heads projecting beyond said winding blocks when said blocks are in one position adjacent said adaptor plates, and said blocks extending at least to said peg heads when said blocks are in a second position spaced from said adaptor plates, resilient means between said adaptor plates and said winding blocks and urging said blocks toward the second position, a chuck axially aligned with said drive shaft, means rotatably supporting said chuck for movement toward and away from said winding blocks, means for moving said chuck toward and away from said winding blocks, a pair of clamping plates, means attaching said clamping plates to said chuck, said clamping plates each having openings aligned with said winding pegs to receive said heads of said pegs, spacer plates between said clamping plates and said winding blocks to limit movement of said clamping plates and said winding blocks toward one another, and brake means for abruptly stopping rotary movement of said drive plate and said chuck when said motor is stopped.

8. A winder according to claim 7 characterized by means for predetermining the number of revolutions to be made by said motor.

References Cited

UNITED STATES PATENTS

| | | | |
|---|---|---|---|
| 1,396,033 | 11/1921 | Francis | 140—92.2 |
| 1,731,183 | 10/1929 | Thacker | 140—92.2 |
| 1,828,822 | 10/1931 | Smith | 140—92.2 |
| 1,993,970 | 3/1935 | MacMurray | 140—92.2 X |
| 2,406,130 | 8/1946 | Boyce | 140—92.2 |
| 2,479,391 | 8/1949 | Miller | 140—92.2 |

FRANK J. COHEN, *Primary Examiner.*

B. S. TAYLOR, *Assistant Examiner.*